US012722859B2

(12) United States Patent
Lee et al.

(10) Patent No.: US 12,722,859 B2
(45) Date of Patent: Sep. 1, 2026

(54) CAP SYSTEM

(71) Applicants: Moung Young Lee, Incheon (KR); Ji Ho Lee, Incheon (KR); Ji Won Lee, Incheon (KR)

(72) Inventors: Moung Young Lee, Incheon (KR); Ji Ho Lee, Incheon (KR); Ji Won Lee, Incheon (KR)

( * ) Notice: Subject to any disclaimer, the term of this patent is extended or adjusted under 35 U.S.C. 154(b) by 169 days.

(21) Appl. No.: 18/692,322

(22) PCT Filed: Sep. 15, 2022

(86) PCT No.: PCT/KR2022/013750

§ 371 (c)(1),
(2) Date: Mar. 14, 2024

(87) PCT Pub. No.: WO2023/043206

PCT Pub. Date: Mar. 23, 2023

(65) Prior Publication Data

US 2024/0425250 A1 Dec. 26, 2024

(30) Foreign Application Priority Data

Sep. 16, 2021 (KR) ........................ 10-2021-0123689
Mar. 16, 2022 (KR) ........................ 10-2022-0032994
Sep. 14, 2022 (KR) ........................ 10-2022-0115912

(51) Int. Cl.
*B65D 47/12* (2006.01)
*B65D 41/04* (2006.01)
(Continued)

(52) U.S. Cl.
CPC ............. *B65D 51/18* (2013.01); *B65D 41/04* (2013.01); *B65D 43/02* (2013.01); *B65D 47/122* (2013.01);
(Continued)

(58) Field of Classification Search
CPC .... B65D 51/18; B65D 47/122; B65D 47/265; B65D 47/32; B65D 53/02;
(Continued)

(56) References Cited

U.S. PATENT DOCUMENTS 4,961,521 A * 10/1990 Eckman ................. A47G 19/24 222/545
5,588,563 A * 12/1996 Liu ....................... G01F 11/261 222/158
(Continued)

FOREIGN PATENT DOCUMENTS

JP 2006-151412 A 6/2006
JP 2009-269664 A 11/2009
(Continued)

OTHER PUBLICATIONS

Korean Office Action mailed on Apr. 2, 2024.
Korean Office Action mailed on Mar. 20, 2024.

*Primary Examiner* — Frederick C Nicolas
(74) *Attorney, Agent, or Firm* — You & IP, LLC

(57) ABSTRACT

A cap system is disclosed. The cap system includes an inner bottle cap including an upper cover unit with a discharge hole, a side cover unit protruding downward from the upper cover unit, and a stopper protruding upward from an upper surface of the upper cover unit, wherein an inner thread is formed on an inner surface of the side cover unit to engage with a thread formed at an inlet of the storage container, and an O-ring groove is formed on an outer surface of the side cover unit, a body unit including a cover unit covering a portion of an upper portion of the body unit, an opening hole opening a portion of the upper portion and a stoppage unit configure to protrude downward from a lower surface of the cover unit and be caught by the stopper of the inner bottle cap wherein an opening (Continued)

is formed in a lower portion of the body unit and a space portion is formed therein for inserting the inner bottle cap, a coupling unit configured to be formed to protrude upward from the body unit in order to be inserted into and fixed to the inner bottle cap, and an O-ring for sealing between the body unit and the inner bottle cap.

8 Claims, 16 Drawing Sheets

(51) Int. Cl.
*B65D 43/02* (2006.01)
*B65D 47/26* (2006.01)
*B65D 47/32* (2006.01)
*B65D 51/16* (2006.01)
*B65D 51/18* (2006.01)
*B65D 53/02* (2006.01)

(52) U.S. Cl.
CPC ........... *B65D 47/265* (2013.01); *B65D 47/32* (2013.01); *B65D 51/16* (2013.01); *B65D 53/02* (2013.01); *B65D 2251/0015* (2013.01); *B65D 2251/0025* (2013.01); *Y02W 30/80* (2015.05)

(58) Field of Classification Search
CPC .... B65D 2251/0015; B65D 2251/0025; B65D 41/04; B65D 43/02; B65D 51/16; Y02W 30/80
See application file for complete search history.

(56) References Cited

U.S. PATENT DOCUMENTS 5,626,260 A * 5/1997 Waldner .................. G01F 11/24 222/144.5
6,283,339 B1 * 9/2001 Morrow .................. G01F 23/24 222/548
7,748,579 B1 * 7/2010 Shin ....................... B65D 83/06 222/548
8,839,803 B2 * 9/2014 Holloway .............. A45D 33/08 222/548
2022/0312932 A1 * 10/2022 Zhao ........................ A61Q 5/06
2023/0312191 A1 * 10/2023 Gill .......................... G01N 1/14 73/864.63

FOREIGN PATENT DOCUMENTS

JP 2014-009011 A 1/2014
KR 20-0157731 Y1 10/1999
KR 20-0205316 Y1 12/2000
KR 20-0208790 Y1 1/2001
KR 20-0328710 Y1 10/2003
KR 10-2006-0006695 A 1/2006
KR 10-1135572 B1 4/2012
KR 10-2013-0011553 A 1/2013
KR 10-1453169 B1 11/2014
KR 10-2014-0140750 A 12/2014

* cited by examiner

CAP SYSTEM

BACKGROUND OF THE INVENTION

Field of the Invention

The present invention relates to a cap system, and more specifically, to a cap system for maintaining carbonic acid that can prevent carbonic acid from leaking out of carbonated beverages contained in a storage container, or to a cap system for preventing carbonic acid leakage.

Discussion of the Related Art

Carbonated beverages such as cider, cola, and beer are distributed being stored in storage containers such as plastic bottles with threads formed on the inlet. Carbonated beverages are shipped with the bottle cap connected to the thread formed on the inlet to seal the storage container. If the bottle cap is not opened, the storage container remains airtight and the carbonic acid contained in the stored beverage does not leak to the outside. However, once the bottle cap is opened, the storage container is not completely sealed even if the bottle cap is closed again, so the carbonic acid contained in the stored beverage leaks through the minute gap between the bottle cap and the mouth of the storage container, causing the taste, aroma, and texture of the stored beverage to gradually deteriorate. In particular, as the empty space inside the storage container increases due to the discharge of the stored beverage, the leakage of carbonic acid accelerates, and some consumers even throw away the decarbonated beverage.

Registered Utility Model Publication 20-0328710 discloses a device that store a storage container in which carbonated beverages by turning it upside down after it being opened, and Registered Patent Publication 10-1453169 discloses combining an empty bottle with a storage container in which carbonated beverages are stored, injecting air from the empty bottle into the storage container, increasing the pressure in the empty space of the storage container, and minimizing the amount of carbonic acid leakage as a result.

SUMMARY OF THE INVENTION

The problem to be solved by the present invention lies on providing cap system for preventing carbonic acid leakage during storage and at the same time, even when opening the bottle cap from storage container, and having a compatible and simple structure that can be mounted on the inlet of an existing carbonated beverage storage container.

Another problem to be solved by the present invention lies on providing a cap system that can quickly discharge a beverage when pouring it from a storage container.

Another problem to be solved by the present invention lies on providing a cap system that can be produced at low cost and is reusable.

Another problem to be solved by the present invention lies on providing a cap system that can be produced at low cost and is reusable.

Another problem to be solved by the present invention lies on providing a cap system for enabling the discharge hole of the inner lid to be easily opened when pouring a beverage, and allowing the inner lid to completely close the inlet of the storage container when covering the discharge hole of the inner lid.

The cap system according to the present invention includes an inner bottle cap for coupling with an inlet of a storage container to be fixed to the storage container, wherein a discharge hole is formed at a top of the inner bottle cap, a body unit including a cover unit covering a portion of an upper portion of the body unit and an opening hole opening a portion of the upper portion wherein an opening is formed in a lower portion of the body unit and a space portion is formed therein for inserting the inner bottle cap and a coupling unit configured to be formed to protrude upward from the body unit in order to be inserted into and fixed to the inner bottle cap. Herein, the inner diameter of the body unit may be equal to or larger than the outer diameter of the coupling unit.

Preferably, with the inner bottle cap inserted into the body unit, the cover unit may cover the discharge hole according to the rotation of the body unit. With the inner bottle cap inserted into the body unit, the opening hole may be positioned above the discharge hole according to the rotation of the body unit rotates.

Preferably, a thread may be formed on an inner surface of the body unit, and a thread may be formed on an outer surface of the inner bottle cap to engage with the thread of the body unit.

Preferably, a locking groove is formed on the outer surface of the inner bottle cap, and the body unit includes a locking unit that protrudes inward from the side of the body unit and can be inserted into the locking groove, and when the inner bottle cap is inserted into the body unit, the locking unit is inserted into the locking groove, so that the body unit can be fixed to the inner bottle cap.

Preferably, the cap system according to the present invention further includes an air tube for fluid to flow, an upper tube for inserting the air tube is formed in the cover unit, and a lower tube for inserting the air tube may be formed in the inner bottle cap. Herein, the air tube can be inserted into the upper tube and the lower tube to be able to move up and down.

Preferably, the inner bottle cap may include an inner thread to be formed on an inside of the inner bottle cap for coupling with a thread formed on the inlet of the storage container, and a thread may be formed in the coupling unit for engaging with the inner thread of the inner bottle cap.

Preferably, the cap system according to the present invention may include an inner bottle cap including a moving unit protruding downward from a bottom of a side of the inner bottle cap, wherein a discharge hole is formed at the top of the inner bottle cap and an inner thread is formed on an inner side of the inner bottle cap for engaging a thread formed in the inlet of the storage container, a body unit including a cover unit covering a portion of an upper portion of the body unit, an opening hole opening a portion of the upper portion, and a stopper configured to protrude inward from a side of the body unit for being caught on the moving unit wherein an opening is formed in a lower portion of the body unit and a space portion is formed therein for inserting the inner bottle cap, and a coupling unit configured to be formed to protrude upward from the body unit in order to be inserted into and fixed to the inner bottle cap. With the inner bottle cap inserted into the body unit, the cover unit may cover or open the discharge hole according to the body unit rotates. As the body unit rotates, the stopper part rotates and catches the moving unit, and the stopper pushes the moving unit to rotate the inner bottle cap.

Preferably, the stopper may include a first stopper and a second stopper spaced apart from the first stopper, and the moving unit may include a first moving unit and a second moving unit spaced apart from the first moving unit, and when the first moving unit is caught by the first moving unit and the second stopper is caught by the second moving unit, the cover unit covers the discharge hole and if the body unit is further rotated in the direction in which the first stopper pushes the first moving unit, the inner bottle cap may be rotated to close the inlet of the storage container. When the first stopper is caught by the second moving unit and the second stopper is caught by the first moving unit, the cover unit opens the discharge hole and if the body unit is further rotated in the direction in which the first stopper pushes the second moving unit, the inner bottle cap may be rotated in a direction that opens from the inlet of the storage container.

Preferably, the stopper may move along the thread formed in the inlet of the storage container. When the inner bottle cap is coupled to the storage container, the inner bottle cap is inserted into the space portion in an interference fit manner by pressing the body unit, so that a lower side of the inner bottle cap may be caught in the stopper.

Preferably, the cap system according to the present invention may further an air tube for fluid to flow, an upper tube for inserting the air tube is formed in the cover unit, and a lower tube for inserting the air tube may be formed in the inner bottle cap.

Preferably, the coupling unit may be formed with a thread for coupling to the inner thread of the inner bottle cap.

Preferably, the cap system according to the present invention may include an inner bottle cap including an upper cover unit with a discharge hole, a side cover unit protruding downward from the upper cover unit, and a stopper protruding upward from an upper surface of the upper cover unit, wherein an inner thread is formed on an inner surface of the side cover unit to engage with a thread formed at an inlet of the storage container, and an O-ring groove is formed on an outer surface of the side cover unit, a body unit including a cover unit covering a portion of an upper portion of the body unit, an opening hole opening a portion of the upper portion and a stoppage unit configure to protrude downward from a lower surface of the cover unit and be caught by the stopper of the inner bottle cap wherein an opening is formed in a lower portion of the body unit and a space portion is formed therein for inserting the inner bottle cap, a coupling unit configured to be formed to protrude upward from the body unit in order to be inserted into and fixed to the inner bottle cap, and an O-ring for sealing between the body unit and the inner bottle cap. With the inner bottle cap inserted into the body unit, the cover unit may cover or open the discharge hole according to the rotation of the body unit.

Preferably, a second O-ring groove is further formed on the outer surface of the side cover unit, the cap system according to the present invention may further include a second O-ring for being inserted into the second O-ring groove to seal between the body unit and the inner bottle cap.

Preferably, the stopper may be located to the left of the discharge hole, and the discharge hole may be located forward of the stopper.

Preferably, the stoppage unit is formed in a semicircular shape, one end side of the stoppage unit is located to the right of the opening hole, the other end side of the stoppage unit is located to the left of the opening hole, the opening hole is located forward of the stoppage unit, when the stopper is caught on one end side of the stoppage unit, the cover unit covers the discharge hole, and when the stopper is caught on the other end side of the stoppage unit, the opening hole is located above the discharge hole, and the discharge hole may be opened.

Preferably, the cap system according to the present invention further includes an air tube for fluid to flow, an upper tube for inserting the air tube is formed in the cover unit, and a lower tube for inserting the air tube may be formed in the inner bottle cap.

According to the cap system of the present invention, the structure of the inner bottle cap corresponds to the structure of the commercialized bottle cap structure and the cap system has a double opening/closing structure and a rotating opening/closing structure, so that it has a compatibility and simple structure that can be mounted on the inlet of the storage container of an existing carbonated beverage, It prevents carbonic acid leakage during storage and at the same time prevents carbonic acid leakage when opening the storage container by opening the bottle cap.

When pouring a beverage from a storage container, air is injected into the air tube, allowing the beverage to be discharged quickly, and internal air pressure is maintained to further prevent carbonic acid leakage.

Due to the conventional bottle cap structure and the simple structure of the body unit and coupling unit, it is possible to produce a reusable cap system at a low cost.

By providing a stopper in the body unit, the sealing force between the body unit and the inner bottle cap is improved, when pouring a beverage, the discharge hole of the inner bottle cap can be easily opened by rotating the body unit due to the interaction between the stopper of the body unit and the moving unit of the inner bottle cap, and As the inner bottle cap can be rotated through the body unit while the body unit covers the discharge hole of the inner bottle cap, the inner bottle cap can be perfectly closed on the inlet of the storage container, and users can easily check the closed state of the inner bottle cap.

By placing an O-ring between the body unit and the inner bottle cap, the sealing power is further improved, preventing carbonic acid leakage even when storing drinks for a lengthy period. Due to the interaction between the stoppage unit of the body unit and the stopper of the inner bottle cap, when pouring a beverage, the discharge hole of the inner bottle cap can be easily opened by rotating the body unit, and As the inner bottle cap can be rotated through the body unit while the body unit covers the discharge hole of the inner bottle cap, the inner bottle cap can be perfectly closed on the inlet of the storage container, and Users can easily check the closed state of the inner bottle cap.

DETAILED DESCRIPTION OF THE INVENTION

Reference will now be made in detail to the preferred embodiments of the cap system according to the present invention, examples of which are illustrated in the accompanying drawings. It is to be understood that both the foregoing general description and the following detailed description of the present invention are exemplary and explanatory and are intended to provide further explanation of the invention as claimed. Furthermore, it is to be understood that the technical spirit and the fundamental structure and operation of the present invention will not be limited to the description of the present invention.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that terms used in the present invention should be defined, not simply by the actual terms used but by the meaning of each term lying within and also based upon the overall content of the description of the present invention.

The cap system according to the present invention may be a cap system for maintaining carbonic acid or a cap system for preventing carbonic acid leakage.

Figure 1:
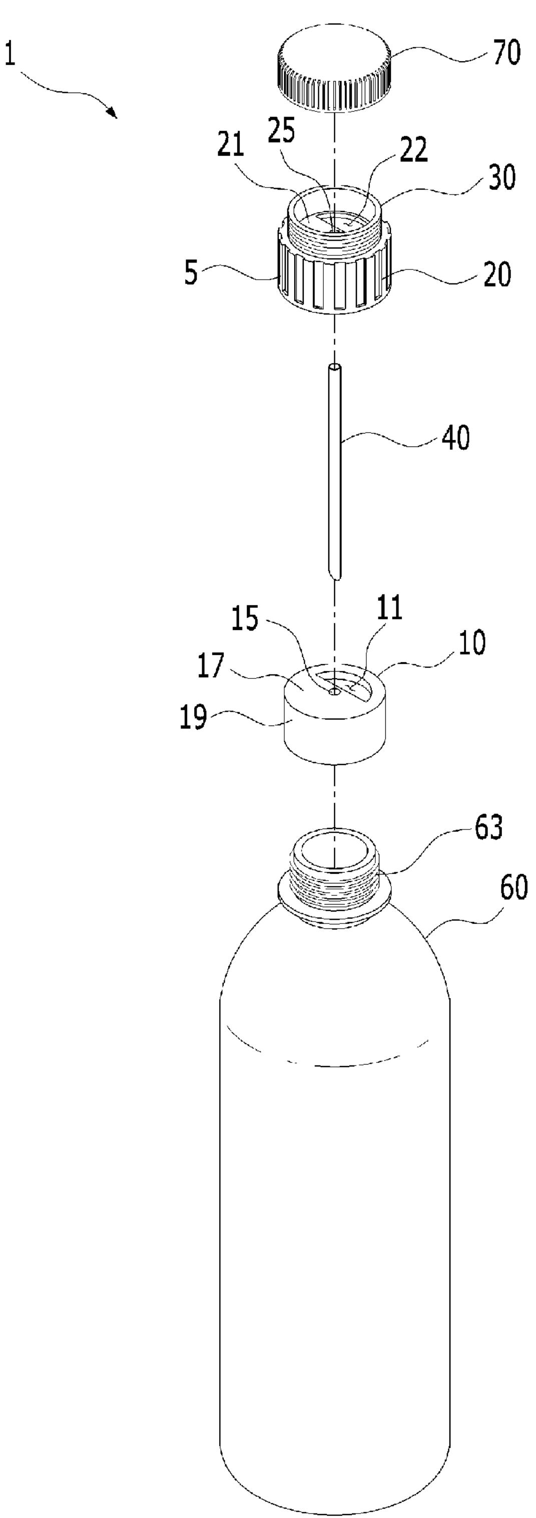
FIG. 1 illustrates an exploded perspective view of a cap system according to a preferred embodiment of the present invention.
Figure 2:
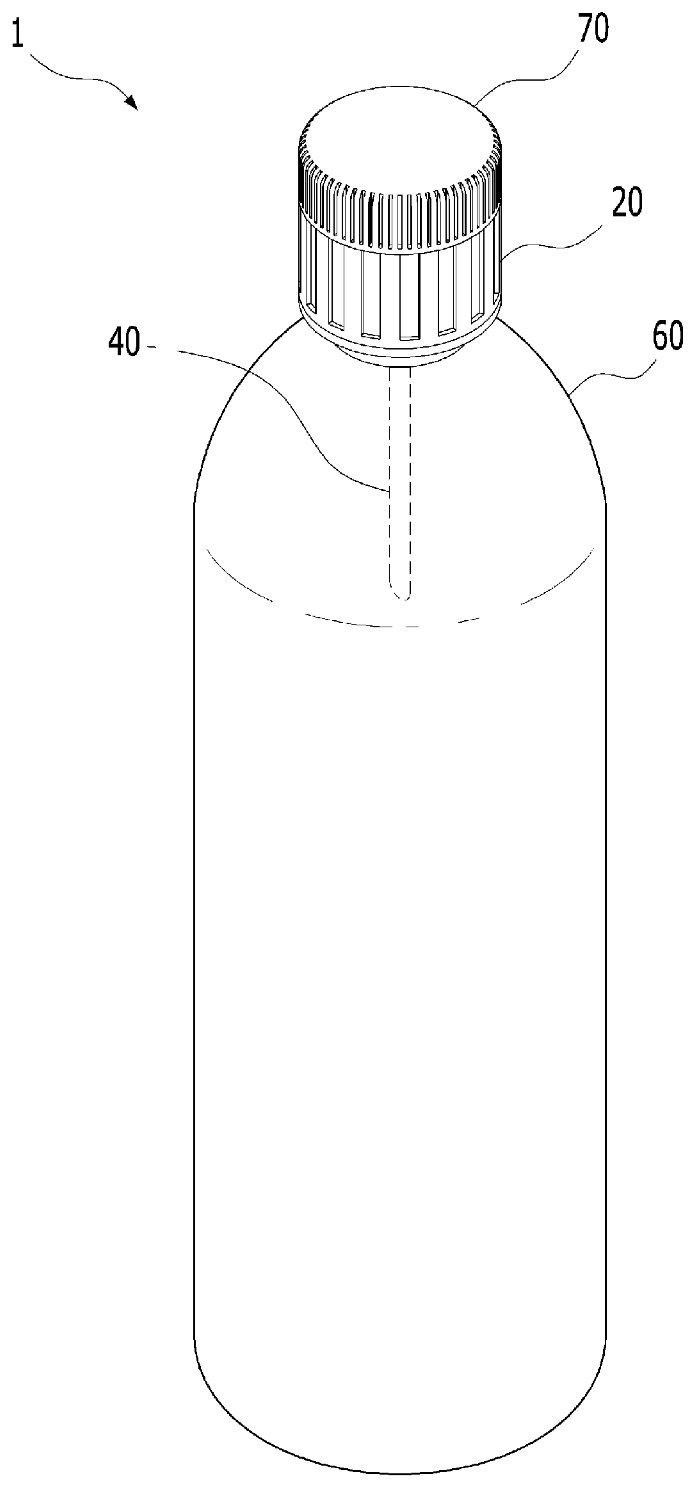
FIG. 2 illustrates a perspective view of a cap system according to a preferred embodiment of the present invention.

FIG. 1 illustrates an exploded perspective view of a cap system according to a preferred embodiment of the present invention and FIG. 2 illustrates a perspective view of a cap system according to a preferred embodiment of the present invention.

Referring to FIGS. 1 and 2, the cap system (1) according to the present invention may include an outer lid (5), an inner bottle cap (10), and an air tube (40). The outer lid (5) may include a body unit (20) and a coupling unit (30).

The storage container (60) may be a storage container for carbonated beverages. The bottle cap (70) is the bottle cap of the storage container (60). In other words, the bottle cap (70) may refer to a bottle cap attached to the storage container (60) when the storage container (60) is shipped or purchased.

Figure 3:
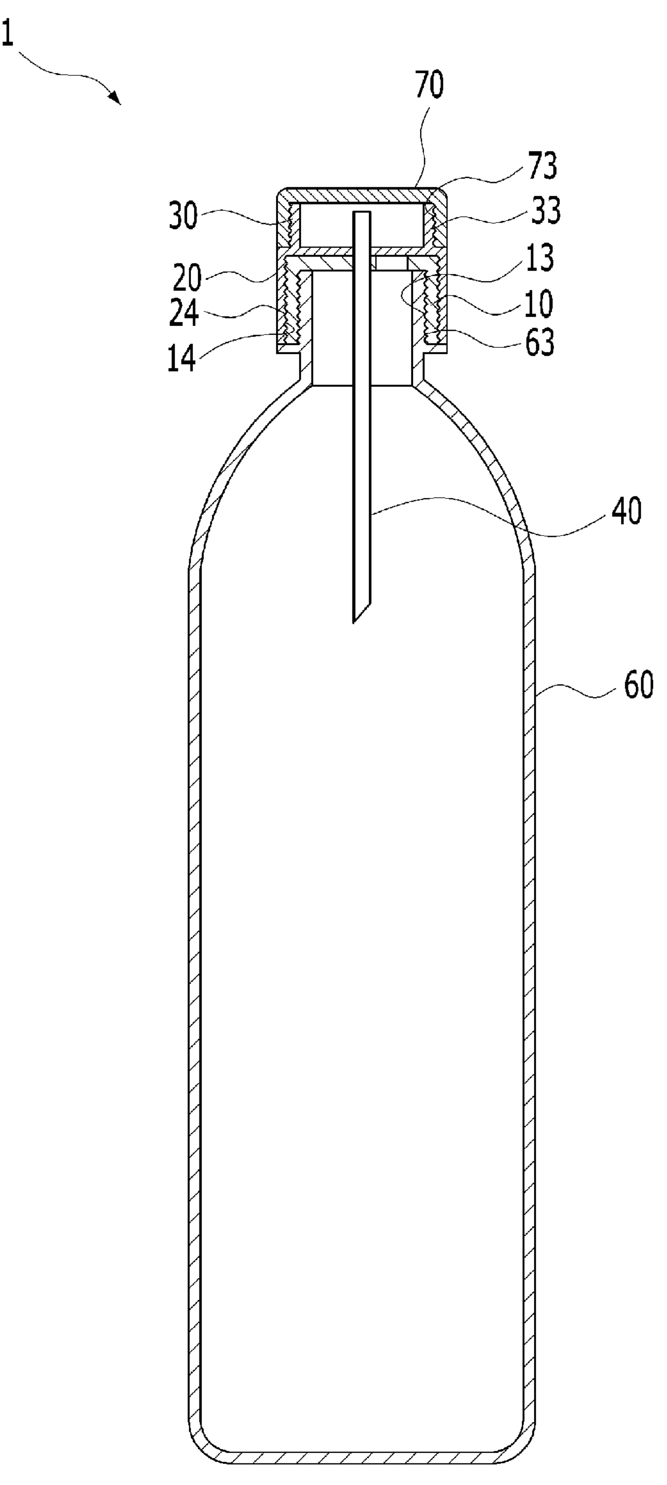
FIG. 3 illustrates a vertical cross-sectional view of a cap system according to a preferred embodiment of the present invention.

FIG. 3 illustrates a vertical cross-sectional view of a cap system according to a preferred embodiment of the present invention.

Referring to FIG. 3, the inner bottle cap (10) may be coupled and fixed to the inlet of the storage container (60), and may include a discharge hole (11) formed at the top, an inner thread (13) formed on the inside to be coupled to the thread (63) formed in the inlet of the storage container (60).

In some embodiments, the inner bottle cap (10) may have an outer thread (14) formed on its outer surface to be coupled to the thread (24) of the body unit (20). When the thread (14) and the thread (24) are coupled to each other, the bonding force between the body unit (20) and the inner bottle cap (10) can be strengthened. In some embodiments, when there is no thread (14) and thread (24), the body unit (20) and the inner bottle cap (10) may be easily attached and detached, and the body unit (20) can be easily rotated.

Additionally, a lower tube (15) may be formed in the inner bottle cap (10) for inserting the air tube (40). The lower tube (15) may be formed in the center of the inner bottle cap (10).

The inner bottle cap (10) may include an upper cover unit (17) and a side cover unit (19) protruding downward from the upper cover unit (17). A discharge hole (11) may be formed in some areas of the upper cover unit (17) and a lower tube (15) may be formed in the center. Here, the discharge hole (11) and the lower tube (15) may be formed to be spaced apart from each other. The upper cover unit (17) may be formed in a circular shape or a plate shape.

The inner thread (13) may be formed inside the side cover unit (19), and the outer thread (14) may be formed outside the side cover unit (19).

The inner thread (13) of the inner bottle cap (10) may be formed to correspond to the thread (73) of the bottle cap (70).

The body unit (20) may include an opening formed at the bottom, a space portion formed inside for inserting the inner bottle cap (10), and a cover unit (21) that covers part of the upper part and an opening hole (22) that opens part of the upper part. The inner bottle cap (10) may be inserted into the interior of the body unit 20 through the opening of the body unit (20) and located in the space portion of the body unit (20).

The cover unit (21) may be formed to protrude inward from the side and may be formed at the top or middle of the body unit (20). A space portion for inserting the inner bottle cap (10) may be located at the bottom of the cover unit (21), and the inner bottle cap (10) can be inserted into the space portion and come into close contact with the cover unit (21). The cover unit (21) may rotate according to the rotation of the body unit (20) to cover the discharge hole (11) of the inner bottle cap (10).

The opening hole (22) may be an empty area in the upper part of the body unit (20) that is not covered by the cover unit (21). The opening hole (22) is rotated according to the rotation of the body unit (20) and may be positioned above the discharge hole (11) of the inner bottle cap (10).

An upper tube (25) into which the air tube (40) is inserted may be formed in the cover unit (21). The upper tube (25) may be located in the center of the cover unit (21). In some embodiments, the air tube (40) may be movably fixed to the upper tube (25). In some embodiments, the air tube (40) may be integrally fixed to the upper tube (25) so that it cannot be moved.

In some embodiments, the body unit (20) may include a thread (24) formed on its inner surface to be coupled to the inner bottle cap (10). The thread (24) of the body unit (20) is combined with the outer thread (14) of the inner bottle cap (10), so that the body unit (20) can be closely adhered to and fixed to the inner bottle cap (10). When the inner bottle cap (10) is inserted into the body unit (20) and tightly coupled, the upper tube (25) and lower tube (15) can be arranged vertically and side by side, forming a conduit. An air tube (40) can be inserted into the conduit and fixed in a movable manner.

The coupling unit (30) may be formed to protrude upward from the body unit (20) and may be inserted into and fixed to the inner bottle cap (10). A thread (33) may be formed on the outside of the coupling unit (30) to be coupled to the inner thread (13) of the inner bottle cap (10). The coupling unit (30) is inserted into the bottle cap (70) and then may be coupled to the bottle cap (70) in such a way that the thread (33) is coupled to the inner thread (73) of the bottle cap (70). The cap system (1) according to the present invention can be stored together by coupling the inner bottle cap (10) to the coupling unit (30) before use, thereby preventing only the inner bottle cap (10) from being lost.

The coupling unit (30) may have a diameter smaller than the inner diameter of the body unit (20).

The air tube (40) may have a conduit through which fluid flows inside. The air tube (40) may be arranged to penetrate the upper tube (25) and lower tube (15). Air is inserted into the storage container (60) through the air tube (40), which can help the beverage contained in the storage container (60) be discharged to the outside more quickly. In some embodiments, the upper and lower positions of the air tube (40) may be adjusted according to the height of carbonated beverages contained in the storage container (60).

Figure 4:
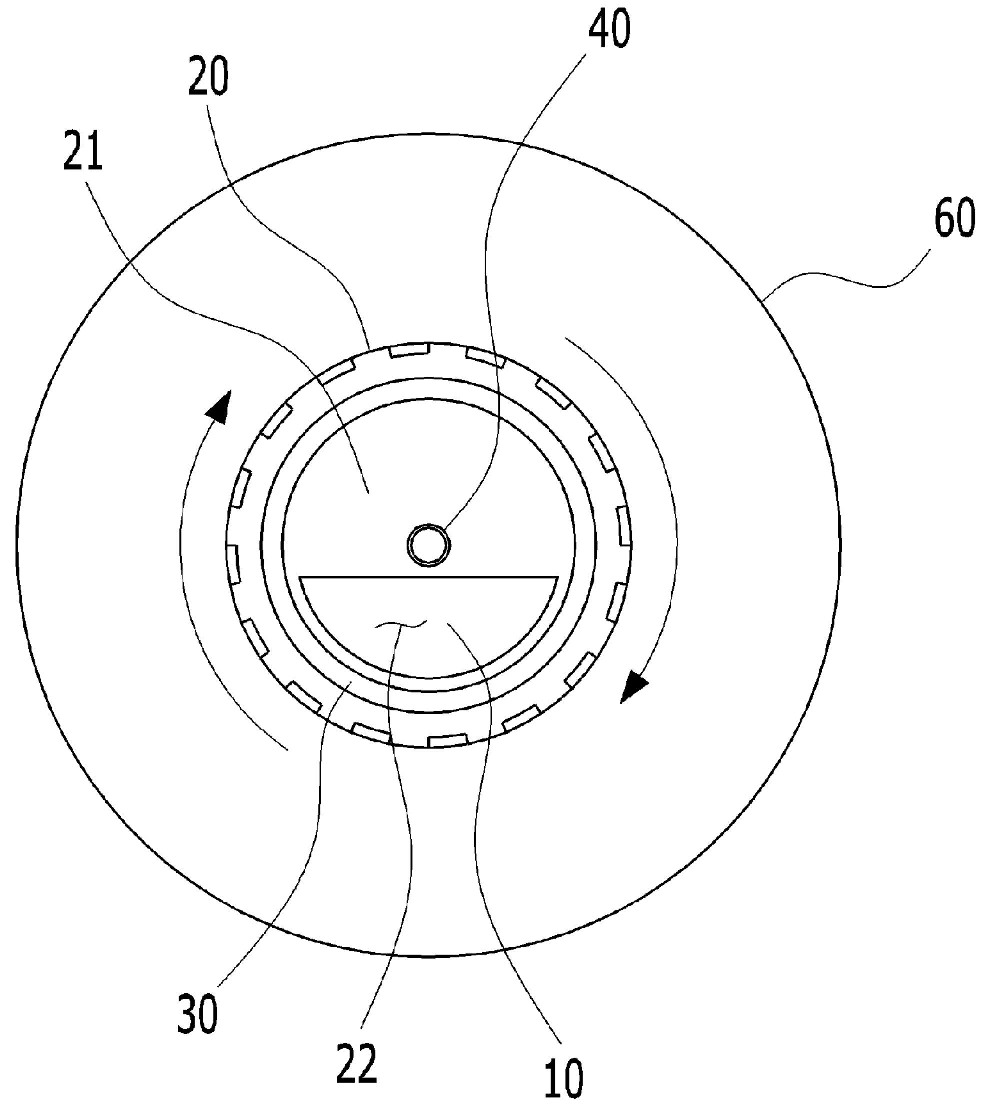
FIG. 4 illustrates a plan view showing a closed state of the cap system according to a preferred embodiment of the present invention.
Figure 5:
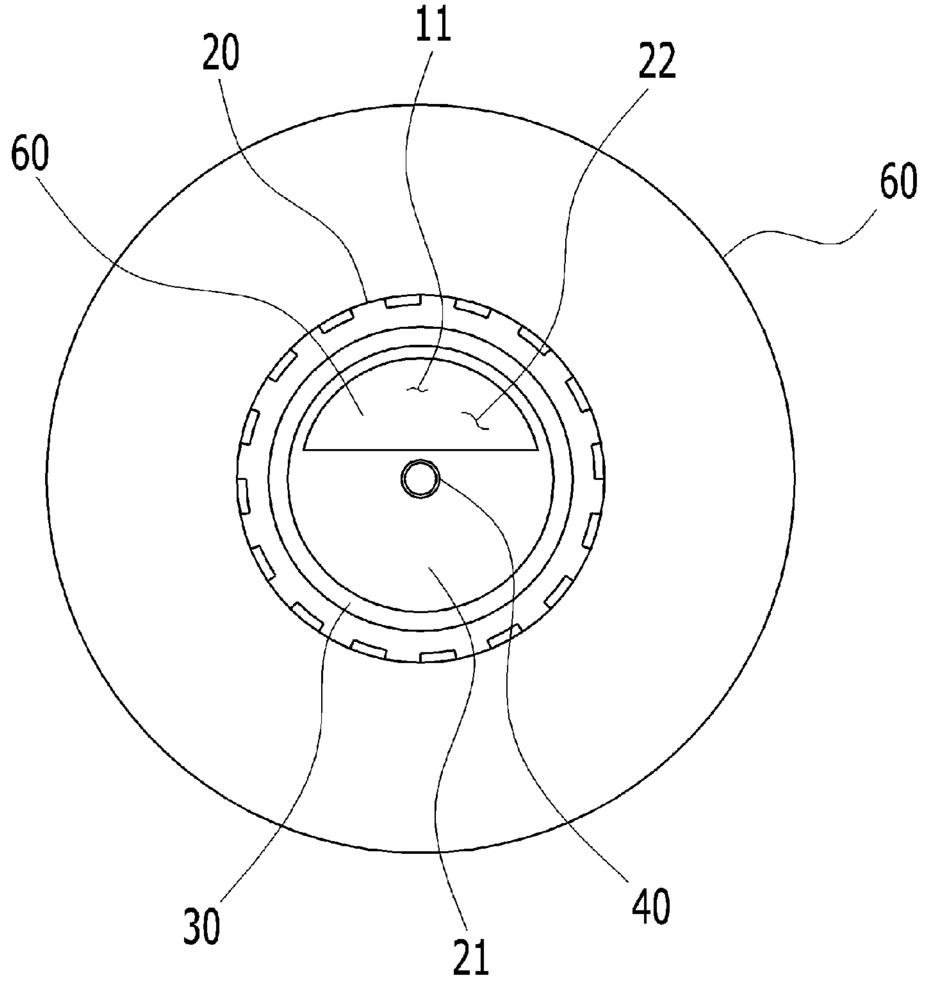
FIG. 5 illustrates a plan view showing the cap system in an open state according to a preferred embodiment of the present invention.

FIG. 4 illustrates a plan view showing a closed state of the cap system according to a preferred embodiment of the present invention and FIG. 5 illustrates a plan view showing the cap system in an open state according to a preferred embodiment of the present invention.

Referring to FIGS. 4 and 5, with the inner bottle cap (10) inserted into the body unit (20), the cover unit (21) can cover or open the discharge hole (11) of the inner bottle cap (10) according to the rotation of the body unit (20). FIG. 4 shows a state in which the cover unit (21) covers the discharge hole (11) of the inner bottle cap (10), the state shown in FIG. 4 means that the cap system (1) according to the present invention is closed. When the cap system (1) is closed, the storage container (60) can be sealed, as shown in FIG. 2, when the bottle cap (70) is additionally coupled to the coupling unit (30), the cap system (1) according to the present invention double seals the storage container (60), the cap system (1) can prevent carbonic acid from leaking during normal storage (when stored).

In the closed state of FIG. 4, when the body unit (20) is rotated, the opening hole (22) of the body unit (20) is located in the discharge hole (11) of the inner bottle cap (10) and the discharge hole (11) of the inner bottle cap (10) is in an open state as shown in FIG. 5, and the cap system 1 according to the present invention can be in an open state. That is, FIG. 5 shows a state in which the discharge hole (11) of the inner bottle cap (10) is open, and the state shown in FIG. 5 means that the cap system (1) according to the present invention is open.

After the user separates the bottle cap (70) from the coupling unit (30) and then lifts the storage container (60) upside down (with the inlet facing the ground) in the closed state of FIG. 4 so that the cap system (1) mounted on the storage container (60) is at the bottom, when the body unit (20) is rotated so that the cap system (1) is in the open state of FIG. 5, the beverage contained in the storage container (60) may be discharged to the outside through the discharge hole (11) and the opening hole (22). At this time, since the air (carbonic acid) in the empty space within the storage container (60) has moved to the upper part (bottom of the storage container), the air (carbonic acid) may remain in the storage container (60) without being discharged even if the cap system (10) is the open state. Accordingly, the cap system (1) according to the present invention can prevent carbonic acid remaining in the empty space of the storage container (60) from leaking even when the storage container (60) is opened. In particular, when drinking beverages stored in a large-capacity storage container (60), they are generally consumed several times. At this time, even if carbonic acid leakage is prevented during storage, carbonic acid leaks during the opening and closing process of the bottle cap (70), and as a result, carbonation is removed from the beverage due to opening and closing the bottle cap (70) several times. But the cap system (1) according to the present invention is effective in maintaining carbonation in the beverage even after opening and closing the bottle cap (70) several times.

Figure 6:
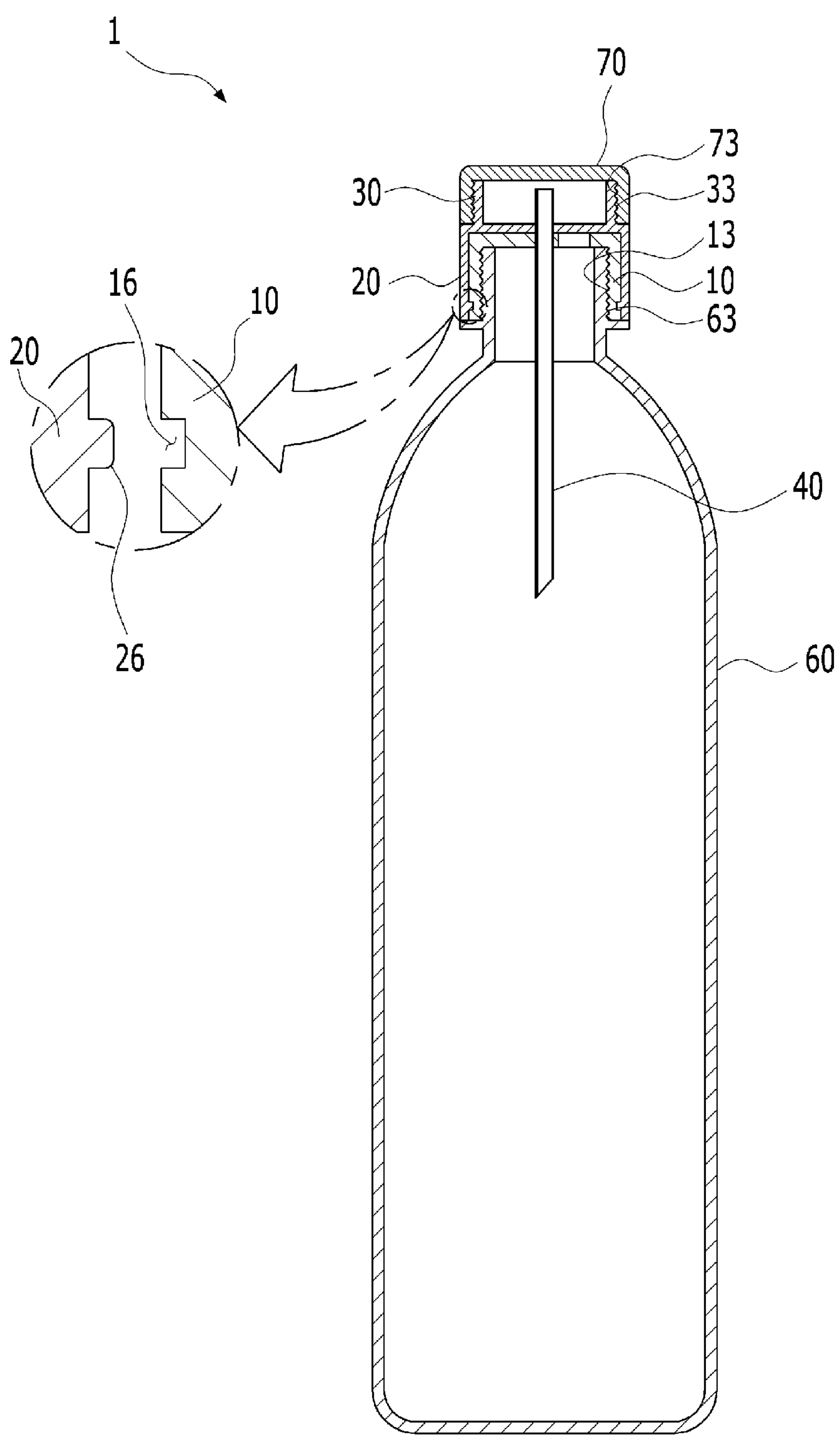
FIG. 6 illustrates a vertical cross-sectional view and a partially enlarged view of a cap system according to another preferred embodiment of the present invention.

FIG. 6 illustrates a vertical cross-sectional view and a partially enlarged view of a cap system according to another preferred embodiment of the present invention.

Referring to FIG. 6, the cap system (2) according to the present invention may include an inner bottle cap (10), a body unit (20), a coupling unit (30), and an air tube (40).

A locking groove (16) may be formed on the outer surface of the inner bottle cap (10). In the body unit (20), a locking unit (26) is formed that protrudes inward from the side of the body unit (20) and may be inserted into the locking groove (16). When the inner bottle cap (10) is inserted into the body unit (20), the locking unit (26) is inserted into the locking groove (16), so that the body unit (20) can be fixed to the inner bottle cap (10). The corners of the locking unit (26) can be rounded, so that the inner bottle cap (10) can be more easily inserted into the body unit (20). The user can confirm that the body unit (20) and the inner bottle cap (10) are completely coupled to each other by checking that the locking unit (26) is inserted into the locking groove (16). The locking groove (160) prevents the body unit (20) from being separated from the inner bottle cap (10) when it rotates, and the body unit (20) can be easily rotated.

The partially enlarged view of FIG. 6 shows the locking groove (16) and the locking unit 26 spaced apart. With the inner bottle cap (10) coupled to the storage container (60), the body unit (20) can be pressed to allow the locking unit (26) to be inserted into the locking groove (16) in an interference fit manner. In some embodiments, as shown in the partially enlarged view of FIG. 6, the corners of the locking unit (26) may be rounded, so that the locking unit (26) can be more easily inserted into the locking groove (16).

The cap system (2) shown in FIG. 6 uses the locking groove (16) of the inner bottle cap (10) instead of the outer thread (14) of the inner bottle cap (10) of the cap system (1) shown in FIG. 3 and uses the locking unit (26) of the body unit (20) instead of the thread (24) of the body unit (20) of the cap system (1) shown in FIG. 3, and the remaining components of the cap system (2) can correspond to the remaining components of the cap system (1) and therefore detailed description is omitted.

Figure 7:
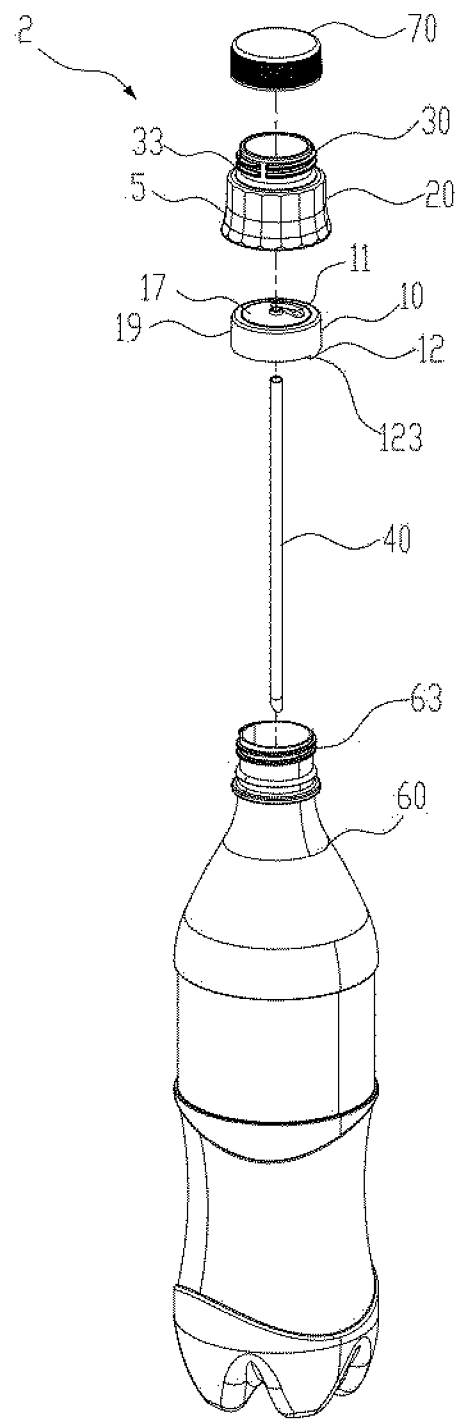
FIG. 7 illustrates an exploded perspective view of a cap system according to yet another preferred embodiment of the present invention.
Figure 8:
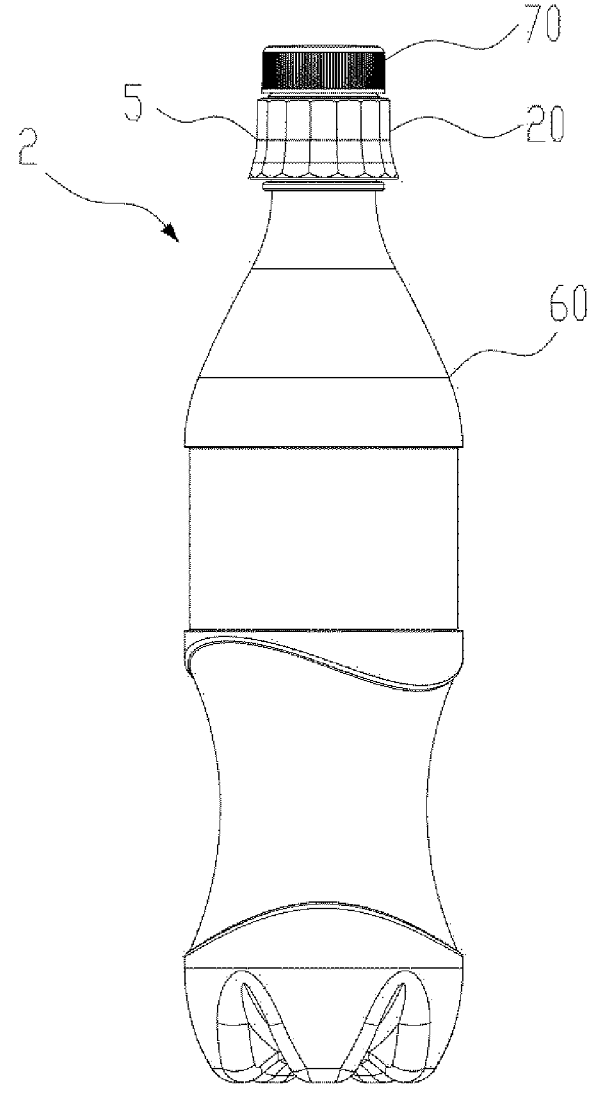
FIG. 8 illustrates a perspective view of a cap system according to yet another preferred embodiment of the present invention.
Figure 9:
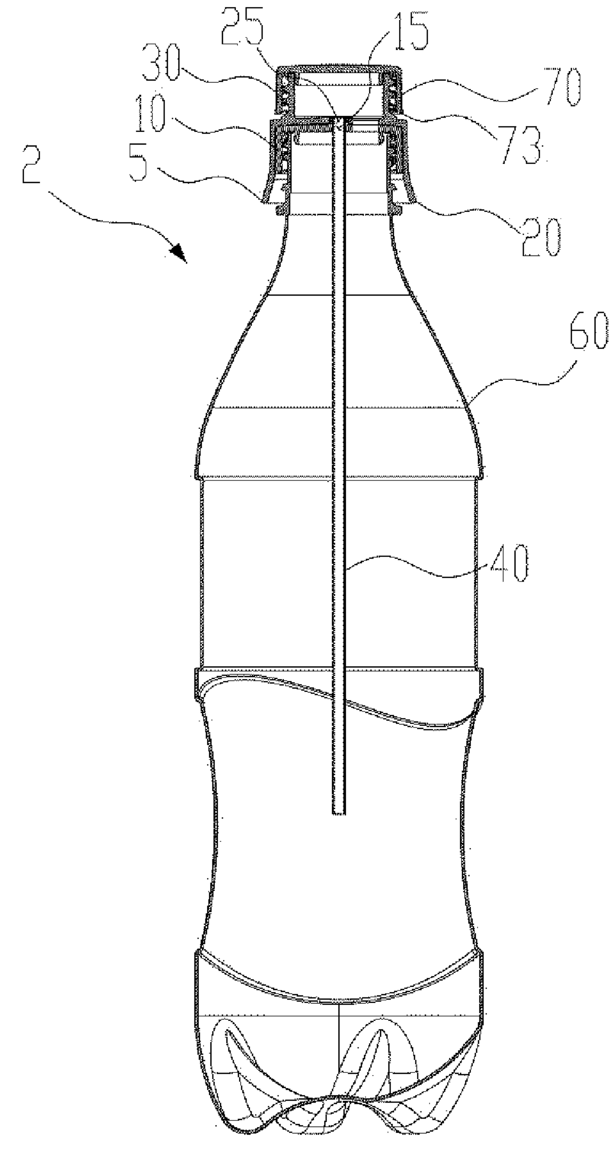
FIG. 9 illustrates a vertical cross-sectional view of a cap system according to yet another preferred embodiment of the present invention.

FIG. 7 illustrates an exploded perspective view of a cap system according to yet another preferred embodiment of the present invention and FIG. 8 illustrates a perspective view of a cap system according to yet another preferred embodiment of the present invention and FIG. 9 illustrates a vertical cross-sectional view of a cap system according to yet another preferred embodiment of the present invention.

Referring to FIGS. 7 to 9, the cap system (2) according to the present invention may include an outer lid (5), an inner bottle cap (10), and an air tube (40). The outer lid (5) may include a body unit (20) and a coupling unit (30).

The storage container 60 may be a storage container for carbonated beverages. The bottle cap (70) is the bottle cap of the storage container (60). In other words, the bottle cap 70 may refer to a bottle cap attached to the storage container (60) when the storage container (60) is shipped or purchased.

Figure 10:
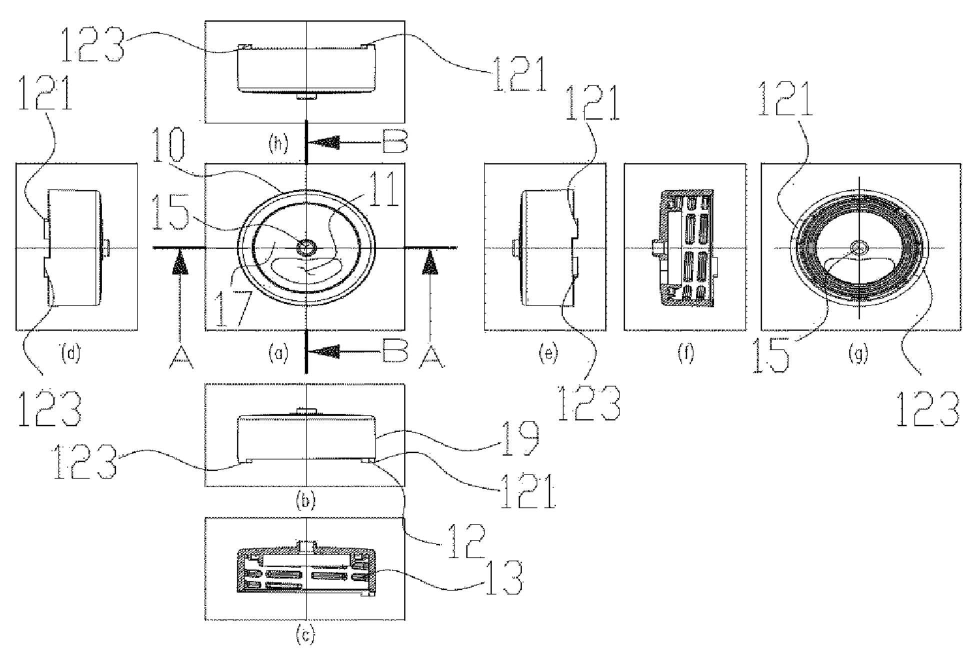
FIG. 10 illustrates a diagram showing an inner bottle cap according to yet another preferred embodiment of the present invention.

FIG. 10 illustrates a diagram showing an inner bottle cap according to yet another preferred embodiment of the present invention. In FIG. 10, (a) is a top view of the inner bottle cap, (b) is a front view of the inner bottle cap, (c) is a cross-sectional view of the inner bottle cap along line AA, (d) is a left side view of the inner bottle cap, (e) is a right side view of the inner bottle cap, (f) is a cross-sectional view of the inner bottle cap along line BB, (g) is a bottom view of the inner bottle cap, and (h) is a rear view of the inner bottle cap.

Referring to FIG. 10, the inner bottle cap (10) can be coupled and fixed to the inlet of the storage container (60) and may include a moving unit (12) protruding downward from the bottom of the side the inner bottle cap (10) and a discharge hole (11) is formed at the top of the inner bottle cap (10) and an inner thread (13) may be formed on the inside of the inner bottle cap 10 to be coupled to the thread (63) formed in the inlet of the storage container (60). The discharge hole (11) may be arranged to be spaced apart from the AA line (the AA line shown in FIG. 10), which is the center line of the inner bottle cap (10).

Additionally, a lower tube (15) may be formed in the inner bottle cap (10) for inserting the air tube (40). The lower tube (15) may be formed in the center of the inner bottle cap (10).

The inner bottle cap 10 may include an upper cover unit (17) and a side cover unit 19 protruding downward from the upper cover unit (17). A discharge hole (11) may be formed in some areas of the upper cover unit (17) and a lower tube (15) may be formed in the center of the upper cover unit (17). Here, the discharge hole (11) and the lower tube (15) may be formed to be spaced apart from each other. The upper cover unit (17) may be formed in a circular shape or a plate shape. An inner thread (13) may be formed inside the side cover unit (19).

The moving unit (12) may be formed to extend downward from the bottom of the side cover unit (19). The moving unit (12) may include a first moving unit (121) and a second moving unit (123). The first moving unit (121) and the second moving unit (123) may be arranged to be spaced apart from each other and may be arranged to be spaced apart from the AA line of the inner bottle cap (10). In some embodiments, when dividing the area of the inner bottle cap (10) based on the AA line of the inner bottle cap (10), the first moving unit (121) may be located in a different area from the discharge hole (11) and the second moving unit (123) may be located in the same area as the discharge hole (11). Herein, the first moving unit 121 and the second moving unit (123) may be equally spaced left and right from each other.

Line BB, which is the center line of the inner bottle cap (10), is perpendicular to line AA and may pass through the center of the discharge hole (11).

The inner thread (13) of the inner bottle cap (10) may be formed to correspond to the thread (73) of the bottle cap (70).

Figure 11:
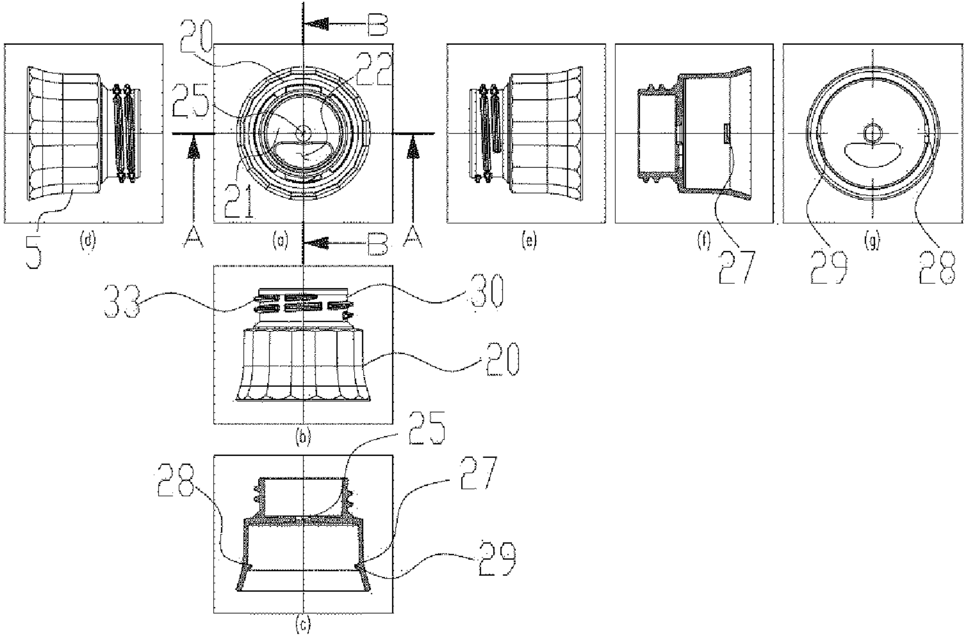
FIG. 11 illustrates a diagram showing an outer lid according to yet another preferred embodiment of the present invention.

FIG. 11 illustrates a diagram showing an outer lid according to yet another preferred embodiment of the present invention. In FIG. 11, (a) is a top view of the outer lid, (b) is a front view of the outer lid, (c) is a cross-sectional view of the outer lid along line AA, (d) is a left side view of the outer lid, (e) is the right side view of the outer lid, (f) is a cross-sectional view of the outer lid along line BB, and (g) is a bottom view of the outer lid.

Referring to FIG. 11, the body unit (20) may include an opening formed at the bottom, a space portion for inserting the inner bottle cap (10) is formed therein. The body unit (20) may include a cover unit (21) that covers part of an upper part of the body unit (20), an opening hole (22) that opens part of the upper part of the body unit (20), and a stopper (27) that protrudes inward from the side of the body unit (20) and is caught by the moving unit (12). The inner bottle cap (10) may be inserted into the interior of the body unit (20) through the opening of the body unit (20) and positioned in the space portion.

The cover unit (21) may be formed to protrude inward from the side of the body unit (20) and may be formed at the top or middle of the body unit (20). A space portion for inserting the inner bottle cap (10) may be located at the bottom of the cover unit (21), and the inner bottle cap (10) may be inserted into the space portion and come into close contact with the cover unit (21). The cover unit (21) may rotate according to the rotation of the body unit (20) to cover the discharge hole (11) of the inner bottle cap (10).

The opening hole (22) may be an empty area in the upper part of the body unit (20) that is not covered by the cover unit (21). The opening hole (22) is rotated according to the rotation of the body unit (20) and may be positioned above the discharge hole (11) of the inner bottle cap (10). The opening hole (22) may be arranged to be spaced apart from line AA, which is the center line of the body unit (20) (line AA shown in FIG. 11).

An upper tube (25) into which the air tube (40) is inserted may be formed in the cover unit (21). The upper tube (25) may be located in the center of the cover unit (21). In some embodiments, the air tube (40) may be movably fixed to the upper tube (25). In some embodiments, the air tube (40) may be integrally fixed to the upper tube (25) so that it cannot be moved. When the inner bottle cap (10) is inserted into the body unit (20) and tightly coupled, the upper tube (25) and lower tube (15) can be arranged vertically and side by side, forming a conduit. An air tube (40) may be inserted into the conduit and fixed in a movable manner.

The stopper (27) protrudes inward from the side of the body unit (20) and may be caught in the moving unit (12).

The stopper (27) may move along the thread (63) formed in the inlet of the storage container (60).

Figure 12:
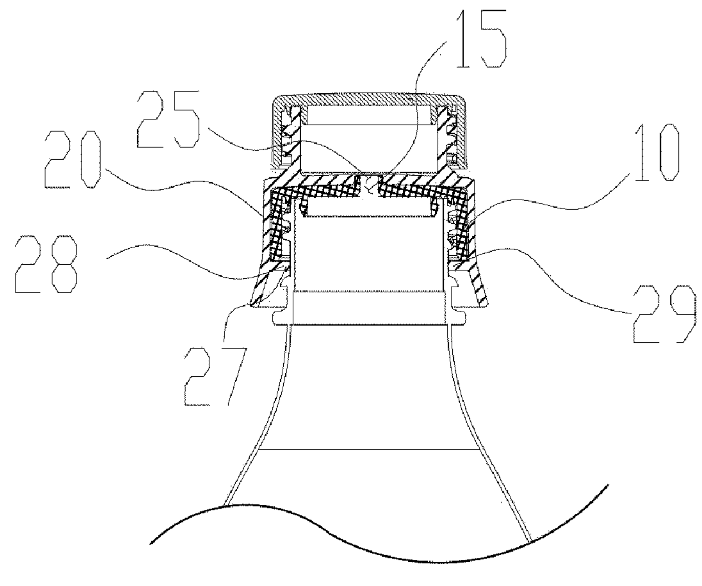
FIG. 12 illustrates a cross-sectional view to explain the state in which the inner bottle cap illustrates inserted and fixed in the outer lid.

FIG. 12 illustrates a cross-sectional view to explain the state in which the inner bottle cap illustrates inserted and fixed in the outer lid.

Referring to FIG. 12, with the inner bottle cap (10) coupled to the storage container (60), By pressing the body unit (20), the inner bottle cap (10) may be inserted into the space portion of the body unit (20) using an interference fit method, and the lower side of the inner bottle cap (10) may be caught on the stopper (27). Accordingly, the inner bottle cap (10) may be inserted into and fixed in the body unit (20). In some embodiments, the corner portion of the stopper (27) may be rounded, thereby allowing the inner bottle cap (10) to be more easily inserted into the body unit (20).

In some embodiments, the height of the space portion of the body unit (20) may be formed to be higher than the height of the inner bottle cap (10).

In some embodiments, the height of the space portion of the body unit (20) may be formed to correspond to the height of the inner bottle cap (10). In this embodiment, the stopper (27) may be formed to protrude inward from the lower side of the body unit (20).

The stopper (27) may include first stopper (28) and second stopper (29). The first stopper (28) and the second stopper (29) may be located on the AA line of the body unit (20), and the opening hole (22) may be located in one of the two areas divided by the AA line. The BB line, which is the center line of the body unit (20), is a line perpendicular to the AA line and may pass through the center of the opening hole (22).

In some embodiments, the distance of the opening hole (22) from the AA line of the body unit (20) may correspond to the distance of the discharge hole (11) from the AA line of the inner bottle cap (10). With the inner bottle cap (10) inserted into the body unit (20), when the AA line of the body unit (20) and the AA line of the inner bottle cap (10) match, the BB line of the body unit (20) and the BB line of the inner bottle cap (10) may coincide and the first stopper (28) and second stopper (29) are located on the AA line of the inner bottle cap (10), and the first stopper (28) may be caught by the second moving unit (123) and the second stopper (29) may be caught in the first moving unit (121).

When the first stopper (28) is caught in the first moving unit (121) and the second stopper (29) is caught in the second moving unit (123), the cover unit (21) may cover the discharge hole (11). With the first stopper (28) caught on the first moving unit (121), when the body unit (20) is rotated in the direction in which the first stopper (28) pushes the first moving unit (121), the inner bottle cap (10) may be rotated to close the inlet of the storage container (60). When the inner bottle cap (10) is completely closed in the inlet of the storage container (60), the movement of the first stopper (28) is restricted, so the user can confirm that the inner bottle cap (10) is completely closed.

When the first stopper (28) is caught in the second moving unit (123) and the second stopper (29) is caught in the first moving unit (121), the opening hole (22) is located above the discharge hole (11) so that the discharge hole (11) can be opened. With the first stopper (28) caught on the second moving unit (123), when the body unit (20) is rotated in the direction in which the first stopper (28) pushes the second moving unit (123), the inner bottle cap (10) may be rotated to open from the inlet of the storage container (60). The user may rotate the body unit (20) to open the inner bottle cap (10) and open the inlet of the storage container (60).

In an embodiment in which the first moving unit 121 and the second moving unit 123 are located in different areas based on the center line AA, when the first stopper (28) is caught in the second moving unit (123) and the second stopper (29) is caught in the first moving unit (121), the first stopper (28) and second stopper (29) may be located at the center line AA and the discharge hole (11) and the opening hole (22) may be positioned coincidentally at the top and bottom, and the opening hole (22) may be located above the discharge hole (11) so that the discharge hole (11) can be opened.

The coupling unit (30) may be formed to protrude upward from the body unit (20) and may be inserted into and fixed to the inner bottle cap (10). A thread (33) may be formed on the outside of the coupling unit (30) for being coupled to the inner thread (13) of the inner bottle cap (10). The coupling unit (30) is inserted into the bottle cap (70), and the coupling unit (30) is coupled to the bottle cap (70) in such a way that the thread (33) is combined with the inner thread (73) of the bottle cap (70). The cap system (2) according to the present invention may be stored together by coupling the inner bottle cap (10) to the coupling unit (30) before use, thereby preventing only the inner bottle cap (10) from being lost.

The coupling unit (30) may have a diameter smaller than the inner diameter of the body unit (20).

The air tube 40 may have a conduit through which fluid flows inside. The air tube (40) may be arranged to penetrate the upper tube (25) and lower tube (15). Air is inserted into the storage container (60) through the air tube (40), which can help the beverage contained in the storage container (60) be discharged to the outside of the storage container (60) more quickly. In some embodiments, the upper and lower positions of the air tube (40) may be adjusted depending on the height of carbonated beverages contained in the storage container (60).

Figure 13:
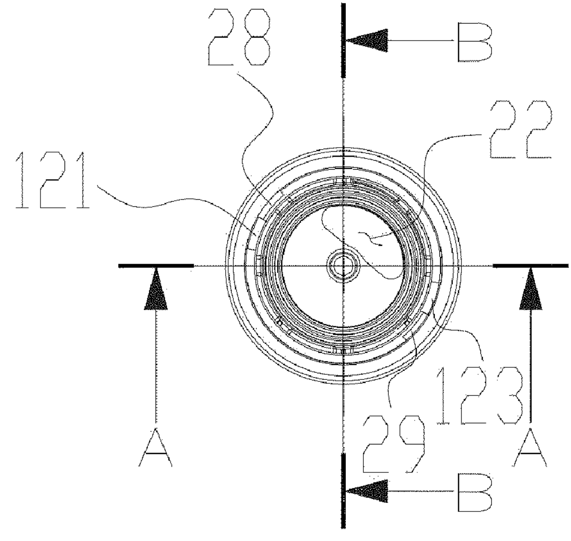
FIG. 13 illustrates a diagram for explaining a closed state of the cap system according to yet another preferred embodiment of the present invention.
Figure 14:
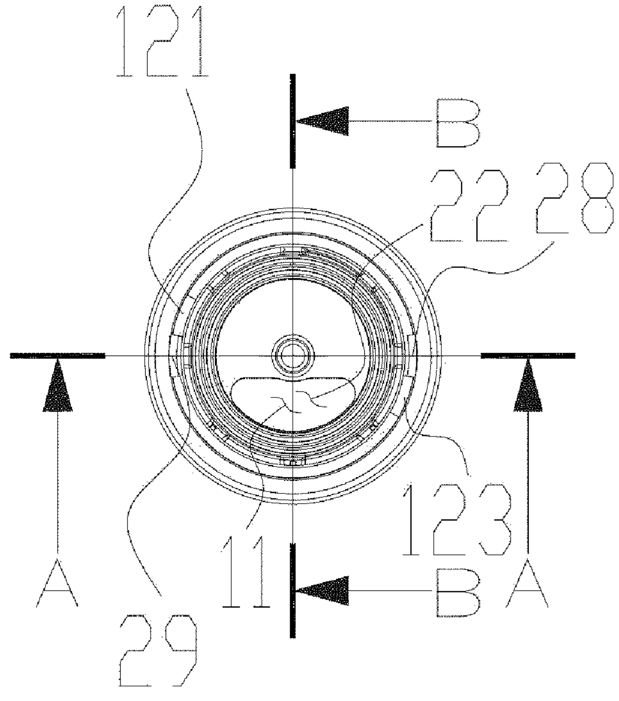
FIG. 14 illustrates a diagram for explaining an open state of the cap system according to yet another preferred embodiment of the present invention.

FIG. 13 illustrates a diagram for explaining a closed state of the cap system according to yet another preferred embodiment of the present invention and FIG. 14 illustrates a diagram for explaining an open state of the cap system according to another preferred embodiment of the present invention.

Referring to FIGS. 13 and 14, with the inner bottle cap (10) inserted into the body unit (20), the cover unit (21) may cover or open the discharge hole (11) of the inner bottle cap (10) according to the rotation of the body unit (20). FIG. 13 shows a case where the first stopper (28) is caught by the first moving unit (121) and the second stopper (29) is caught by the second moving unit (123), and the case indicates the state where the cover unit (21) covers the discharge hole (11) of the inner bottle cap (10) and that the cap system (2) according to the present invention is in a closed state. When the cap system (2) is closed, the storage container (60) may be sealed. As shown in FIG. 8, when the bottle cap (70) is additionally coupled to the coupling unit (30), the cap system (2) according to the present invention can prevent carbonic acid from leaking during normal times (when stored) by doubly sealing the storage container (60).

In the closed state of FIG. 13, when the opening hole (22) of the body unit (20) is located in the discharge hole (11) of the inner bottle cap (10) by rotating the body unit (20), as shown in FIG. 14, the discharge hole (11) of the inner bottle cap 10 becomes in an open state, and the cap system (2) according to the present invention may become in an open state.

FIG. 14 shows a case where the first stopper (28) is caught by the second moving unit (123) and the second stopper (29) is caught by the first moving unit (121), and the case indicates that the discharge hole (11) of the inner bottle cap (10) is open and that the cap system (2) according to the present invention is in an open state. In the state of the FIG. 14, it can be confirmed that the BB line of the body unit (20) and the BB line of the inner bottle cap (10) are aligned, and the first stopper (28) and second stopper (29) are located on the AA line of the inner bottle cap (10), and the first stopper (28) is caught by the second moving unit (123) and the second stopper (29) is caught by the first moving unit (121).

In the closed state of FIG. 13, when the body unit (20) rotates in the direction in which the first stopper (28) pushes the first moving unit (121), the inner bottle cap (10) may be rotated to close the inlet of the storage container (60). In addition, in the open state of FIG. 14, when the body unit (20) is rotated in the direction in which the first stopper (28) pushes the second moving unit (123), the inner bottle cap (10) may be rotated to open from the inlet of the storage container (60).

After the user separates the bottle cap (70) from the coupling unit (30) and then lifts the storage container (60) upside down (with the inlet facing the ground) in the closed state of FIG. 13 so that the cap system (2) mounted on the storage container (60) is at the bottom, when the body unit (20) is rotated so that the cap system (2) is in the open state of FIG. 14, the beverage contained in the storage container (60) may be discharged to the outside through the discharge hole (11) and the opening hole (22). At this time, since the air (carbonic acid) in the empty space within the storage container (60) has moved to the upper part (bottom of the storage container), the air (carbonic acid) may remain in the storage container (60) without being discharged even if the cap system (10) is the open state. Accordingly, the cap system (2) according to the present invention can prevent carbonic acid remaining in the empty space of the storage container (60) from leaking even when the storage container (60) is opened. In particular, when drinking beverages stored in a large-capacity storage container (60), they are generally consumed several times. At this time, even if carbonic acid leakage is prevented during storage, carbonic acid leaks during the opening and closing process of the bottle cap (70), and as a result, carbonation is removed from the beverage due to opening and closing the bottle cap (70) several times. But the cap system (2) according to the present invention is effective in maintaining carbonation in the beverage even after opening and closing the bottle cap (70) several times.

Figure 15:
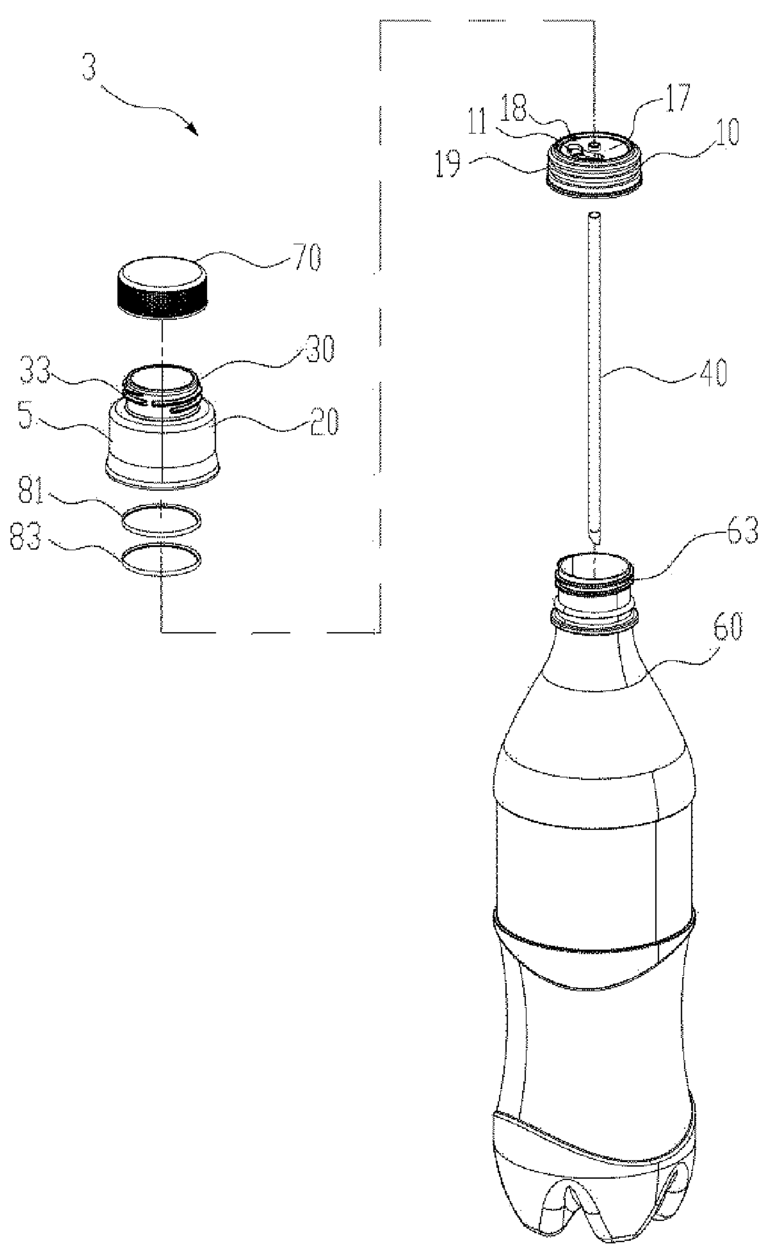
FIG. 15 illustrates an exploded perspective view of a cap system according to yet another preferred embodiment of the present invention.
Figure 16:
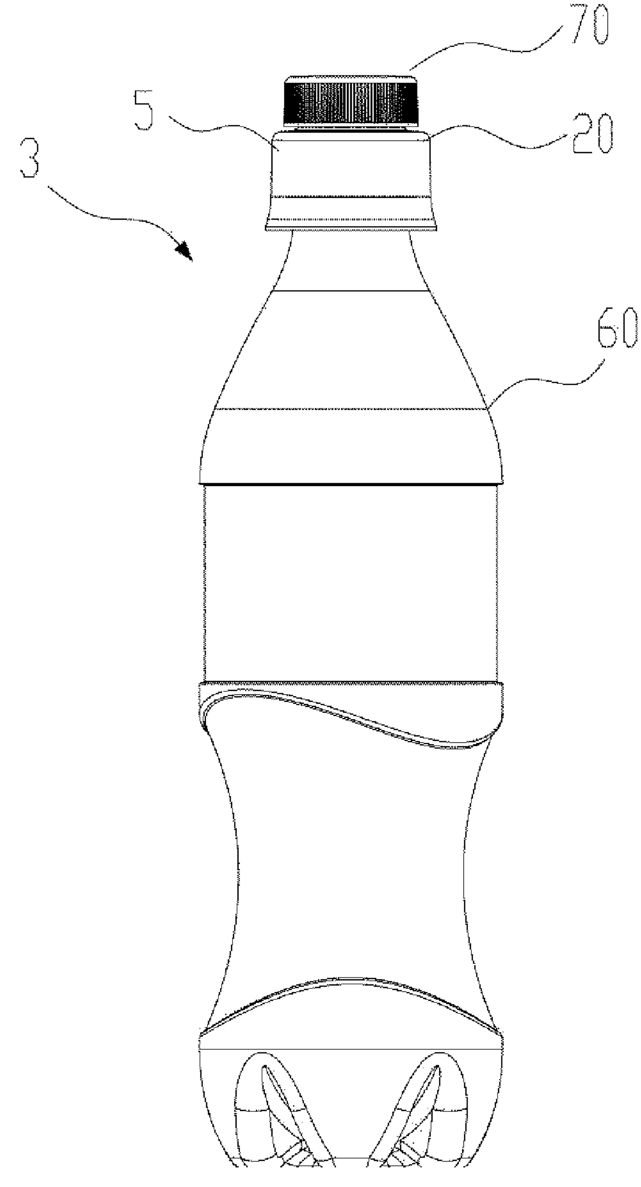
FIG. 16 illustrates a perspective view of a cap system according to yet another preferred embodiment of the present invention.
Figure 17:
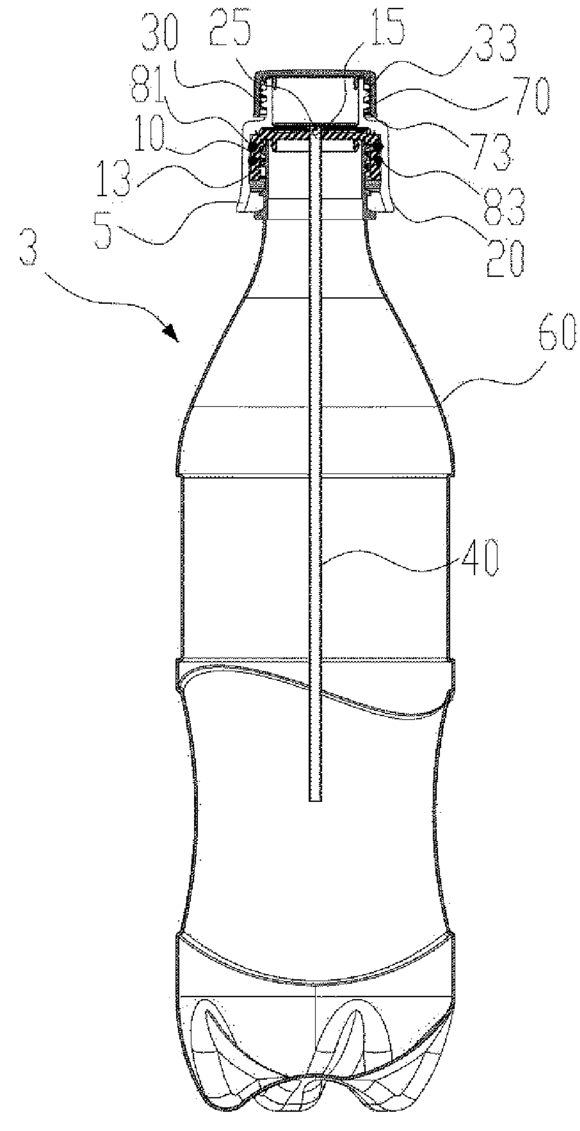
FIG. 17 illustrates a vertical cross-sectional view of a cap system according to yet another preferred embodiment of the present invention.

FIG. 15 illustrates an exploded perspective view of a cap system according to yet another preferred embodiment of the present invention and FIG. 16 illustrates a perspective view of a cap system according to yet another preferred embodiment of the present invention and FIG. 17 illustrates a vertical cross-sectional view of a cap system according to yet another preferred embodiment of the present invention.

Referring to FIGS. 15 to 17, the cap system (3) according to the present invention may include an outer lid (5), an inner bottle cap (10), an air tube (40), a first O-ring (81), and a second O-ring (83). The outer lid (5) may include a body unit (20) and a coupling unit (30).

The storage container 60 may be a storage container for carbonated beverages. The bottle cap (70) is the bottle cap of the storage container (60). In other words, the bottle cap (70) may refer to a bottle cap attached to the storage container (60) when the storage container (60) is shipped or purchased.

Figure 18:
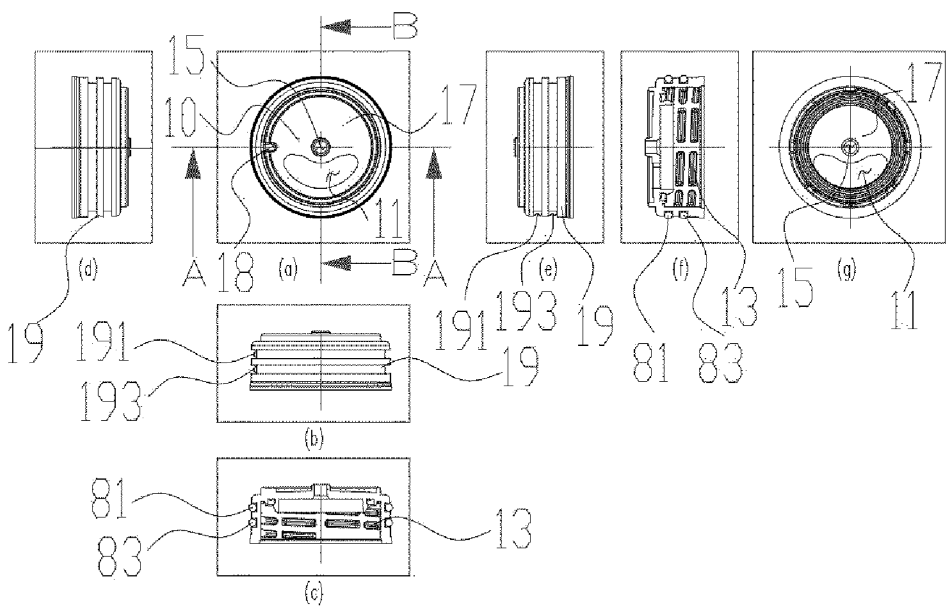
FIG. 18 illustrates a diagram showing an inner bottle cap according to yet another preferred embodiment of the present invention.

FIG. 18 illustrates a diagram showing an inner bottle cap according to yet another preferred embodiment of the present invention. In FIG. 18, (a) is a plan view of the inner bottle cap, (b) is a front view of the inner bottle cap, (c) is a cross-sectional view of the inner bottle cap along line AA, and (d) is a left side view of the inner bottle cap, (e) is a right side view of the inner bottle cap, (f) is a cross-sectional view of the inner bottle cap along line BB, and (g) is a bottom view of the inner bottle cap.

Referring to FIG. 18, the inner bottle cap (10) can be coupled and fixed to the inlet of the storage container (60) and may include a discharge hole (11) is formed at the top of the inner bottle cap (10) and an inner thread (13) may be formed on the inside of the inner bottle cap 10 to be coupled to the thread (63) formed in the inlet of the storage container (60). The discharge hole (11) may be arranged to be spaced apart from the AA line (the AA line shown in FIG. 18), which is the center line of the inner bottle cap (10).

Additionally, a lower tube (15) may be formed in the inner bottle cap (10) for inserting the air tube (40). The lower tube (15) may be formed in the center of the inner bottle cap (10).

The inner bottle cap (10) may include an upper cover unit (17), a stopper (18), a side cover unit (19), a first O-ring groove (191), and a second O-ring groove (193). A discharge hole (11) may be formed in some areas of the upper cover unit (17) and a lower tube (15) may be formed in the center. Herein, the discharge hole (11) and the lower tube (15) may be formed to be spaced apart from each other. The upper cover unit 17 may be formed in a circular shape or a plate shape.

The stopper (18) may protrude upward from the upper cover unit (17). The stopper (180) may be located to the left of the discharge hole (11). The discharge hole (11) may be located forward of the stopper (18).

The side cover unit (19) may protrude downward from the upper cover unit (17). An inner thread (13) may be formed inside the side cover unit (19).

The first O-ring groove (191) may be formed on the outer surface of the side cover unit (19). The first O-ring (81) may be inserted into the first O-ring groove (191).

A second O-ring groove (193) may be formed on the outer surface of the side cover unit (19). The second O-ring groove (193) may be located below the first O-ring groove (191). The second O-ring (83) can be inserted into the second O-ring groove (193).

Line BB, which is the center line of the inner bottle cap (10), is perpendicular to line AA and may pass through the center of the discharge hole (11).

The inner thread (13) of the inner bottle cap (10) may be formed to correspond to the thread (73) of the bottle cap (70).

Figure 19:
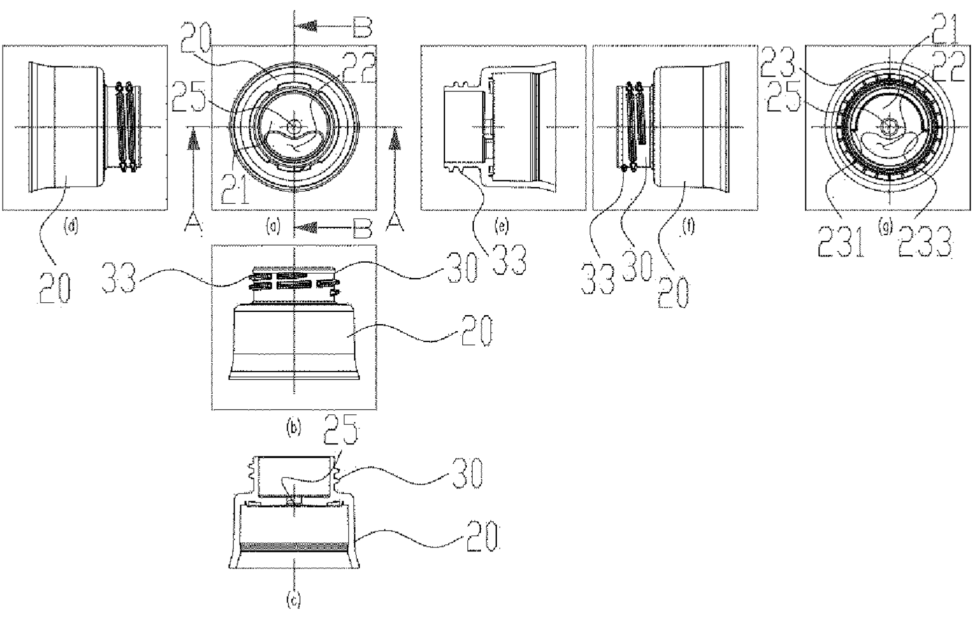
FIG. 19 illustrates a diagram showing an outer lid according to yet another preferred embodiment of the present invention.

FIG. 19 illustrates a diagram showing an outer lid according to yet another preferred embodiment of the present invention. In FIG. 19, (a) is a top view of the outer lid, (b) is a front view of the outer lid, (c) is a cross-sectional view of the outer lid along line AA, (d) is a left side view of the outer lid, (e) is a cross-sectional view of the outer lid along line BB, (f) is a right side view of the outer lid, and (g) is a bottom view of the outer lid.

Referring to FIG. 19, the body unit (20) may include an opening formed at the bottom, a space portion for inserting the inner bottle cap (10) is formed therein. The body unit (20) may include a cover unit (21) that covers part of an upper part of the body unit (20), an opening hole (22) that opens part of the upper part of the body unit (20), and a stoppage unit (23) protrudes from the bottom of the cover unit (21) and is caught on the stopper (18) of the inner bottle cap (10). The inner bottle cap (10) may be inserted into the interior of the body unit (20) through the opening of the body unit (20) and positioned in the space portion.

The cover unit (21) may be formed to protrude inward from the side of the body unit (20) and may be formed at the top or middle of the body unit (20). A space portion for inserting the inner bottle cap (10) may be located at the bottom of the cover unit (21), and the inner bottle cap (10) may be inserted into the space portion and come into close contact with the cover unit (21). The cover unit (21) may rotate according to the rotation of the body unit (20) to cover the discharge hole (11) of the inner bottle cap (10).

The opening hole (22) may be an empty area in the upper part of the body unit (20) that is not covered by the cover unit (21). The opening hole (22) is rotated according to the rotation of the body unit (20) and may be positioned above the discharge hole (11) of the inner bottle cap (10). The opening hole (22) may be arranged to be spaced apart from line AA, which is the center line of the body unit (20) (line AA shown in FIG. 19).

An upper tube (25) into which the air tube (40) is inserted may be formed in the cover unit (21). The upper tube (25) may be located in the center of the cover unit (21). In some embodiments, the air tube (40) may be movably fixed to the upper tube (25). In some embodiments, the air tube (40) may be integrally fixed to the upper tube (25) so that it cannot be moved. When the inner bottle cap (10) is inserted into the body unit (20) and tightly coupled, the upper tube (25) and lower tube (15) can be arranged vertically and side by side, forming a conduit. An air tube (40) may be inserted into the conduit and fixed in a movable manner.

The stoppage unit (23) may be formed in a semicircle, one end side (231) of the stoppage unit (23) may be located to the right of the opening hole (22), and the other end side (233) may be located to the left of the opening hole (22). The opening hole (22) may be located anterior to the stoppage unit (23). When the stopper (18) is caught on one end side (231) of the stoppage unit (23), the cover unit (21) may cover the discharge hole (11), and the cap system (3) may be in a closed state.

When the stopper (18) is caught on the other end side (233) of the stoppage unit (23), the opening hole (22) is located at the top of the discharge hole (11), so the discharge hole (11) may be opened, and the cap system (3) may be in an open state.

If the body unit (20) is rotated clockwise while the cap system (3) is the open state, one end side (231) of the stoppage unit (23) is caught by the stopper (18), and the cap system (3) may become in the closed state. If the body unit (20) continues to rotate clockwise while the cap system (3) is closed, the inner bottle cap (10) may be rotated from the inlet of the storage container (60) in the closing direction. Accordingly, the body unit (20) may be rotated to cause the inner bottle cap (10) to close the inlet of the storage container (60). With the inner bottle cap (10) inserted into the body unit (20), by rotating the body unit (20) clockwise after attaching the inner bottle cap (10) to the inlet of the storage container (60), the inner bottle cap (10) may close the inlet of the storage container (60). When the cap system (3) is closed, the storage container (60) can be sealed.

If the body unit (20) is rotated counterclockwise while the cap system (3) is the closed state, the other end side (233) of the stoppage unit (23) is caught by the stopper (18), and the cap system (3) may become in the open state. If the body unit (20) continues to rotate counterclockwise while the cap system (3) is the open state, the inner bottle cap (10) may be rotated in the direction of opening from the inlet of the storage container (60). Accordingly, the inner bottle cap (10) may be opened from the inlet of the storage container (60) by rotating the body unit (20).

In some embodiments, the stoppage unit (23) may have one end side (231) and the other end side (233) separated from each other.

In some embodiments, with the inner bottle cap (10) coupled to the storage container (60), the inner bottle cap (10) can be inserted into the space portion of the body unit (20) in an interference fit manner by pressing the body unit (20).

The first O-ring 81 and the second ring (83) can seal between the inner bottle cap (10) and the body unit (20). Accordingly, the space between the inner bottle cap (10) and the body unit (20) is double and completely sealed to prevent carbonic acid from leaking from the storage container (60). That is, even when the coupling unit (30) is open, the cap system (3) can completely prevent carbonic acid from leaking from the storage container (60).

In some embodiments, the height of the space portion of the body unit 20 may be formed to be higher than the height of the inner bottle cap (10).

In some embodiments, the height of the space portion of the body unit 20 may be formed to correspond to the height of the inner bottle cap (10).

The coupling unit (30) may be formed to protrude upward from the body unit (20) and may be inserted into and fixed to the inner bottle cap (10). A thread (33) may be formed on the outside of the coupling unit (30) to be coupled to the inner thread (13) of the inner bottle cap (10). The coupling unit (30) is inserted into the bottle cap (70) and then may be coupled to the bottle cap (70) in such a way that the thread (33) is coupled to the inner thread (73) of the bottle cap (70). The cap system (3) according to the present invention can be stored together by coupling the inner bottle cap (10) to the coupling unit (30) before use, thereby preventing only the inner bottle cap (10) from being lost.

The coupling unit 30 may have a diameter smaller than the inner diameter of the body unit 20.

As shown in FIG. 16, when the bottle cap (70) is additionally coupled to the coupling unit (30), the cap system (3) according to the present invention triple seals the storage container (60) with the first O-ring (81), the second ring (83), the inner bottle cap (10), the body unit (20), and the bottle cap (70), thereby preventing carbonic acid from leaking during normal use (during storage) and preventing carbon dioxide from leaking more completely than when there is only the bottle cap (70).

The air tube (40) may have a conduit through which fluid flows inside. The air tube (40) may be arranged to penetrate the upper tube (25) and lower tube (15). Air is inserted into the storage container (60) through the air tube (40), which can help the beverage contained in the storage container (60) be discharged to the outside more quickly. In some embodiments, the upper and lower positions of the air tube (40) may be adjusted according to the height of carbonated beverages contained in the storage container (60).

After the user separates the bottle cap (70) from the coupling unit (30) and then lifts the storage container (60) upside down (with the inlet facing the ground) in the closed state so that the cap system (1) mounted on the storage container (60) is at the bottom, when the body unit (20) is rotated so that the cap system (1) is in the open state, the beverage contained in the storage container (60) may be discharged to the outside through the discharge hole (11) and the opening hole (22). At this time, since the air (carbonic acid) in the empty space within the storage container (60) has moved to the upper part (bottom of the storage container), the air (carbonic acid) may remain in the storage container (60) without being discharged even if the cap system (10) is the open state. Accordingly, the cap system (3) according to the present invention can prevent carbonic acid remaining in the empty space of the storage container (60) from leaking even when the storage container (60) is opened. In particular, when drinking beverages stored in a large-capacity storage container (60), they are generally consumed several times. At this time, even if carbonic acid leakage is prevented during storage, carbonic acid leaks during the opening and closing process of the bottle cap (70), and as a result, carbonation is removed from the beverage due to opening and closing the bottle cap (70) several times. But the cap system (3) according to the present invention is effective in maintaining carbonation in the beverage even after opening and closing the bottle cap (70) several times.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A cap system comprising:

an inner bottle cap for coupling with an inlet of a storage container to be fixed to the storage container, wherein a discharge hole is formed at a top of the inner bottle cap;

a body unit including a cover unit covering a portion of an upper portion of the body unit and an opening hole opening a portion of the upper portion wherein an opening is formed in a lower portion of the body unit and a space portion is formed therein for inserting the inner bottle cap;

a coupling unit configured to be formed to protrude upward from the body unit in order to be inserted into and fixed to the bottle cap, and an air tube for fluid to flow in, wherein the air tube is configured to be inserted into a hole formed in the cover unit and a hole formed in the inner bottle cap.

2. The cap system of claim 1, further comprising:

an O-ring for sealing between the body unit and the inner bottle cap, wherein the inner bottle cap includes an upper cover unit with the discharge hole; a side cover unit protruding downward from the upper cover unit; and a stopper protruding upward from an upper surface of the upper cover unit, wherein an inner thread is formed on an inner surface of the side cover unit to engage with a thread formed at the inlet of the storage container, and an O-ring groove for inserting the O-ring is formed on an outer surface of the side cover unit, and the body unit further comprises a stoppage unit configure to protrude downward from a lower surface of the cover unit and be caught by the stopper of the inner bottle cap.

3. The cap system of claim 2, wherein with the inner bottle cap inserted into the body unit, the cover unit covers or opens the discharge hole according to the rotation of the body unit.

4. The cap system of claim 2, wherein a second O-ring groove is further formed on the outer surface of the side cover unit, further comprising a second O-ring for sealing between the body unit and the inner bottle cap, wherein the second O-ring is inserted into the second O-ring groove.

5. The cap system of claim 2, wherein the stopper is located to the left of the discharge hole and, the discharge hole is located ahead of the stopper.

6. The cap system of claim 2, wherein the stoppage unit is formed in a semicircle, one end side of the stoppage unit is located to a right of the opening hole, and the other end side of the stoppage unit is located to the left of the opening hole, and the opening hole is located ahead of the stoppage unit, when the stopper is caught on the one end side of the stoppage unit, the cover unit covers the discharge hole, when the stopper is caught on the other end side of the stop, the opening hole is located above the discharge hole, so that the discharge hole is opened.

7. The cap system of claim 1, wherein the inner bottle cap includes a moving unit protruding downward from a bottom of a side of the inner bottle cap, and an inner thread is formed on an inner side of the inner bottle cap for engaging a thread formed in the inlet of the storage container, and the body unit further comprises a stopper configured to protrude inward from a side of the body unit for being caught by the moving unit.

8. The cap system of claim 7, wherein the stopper includes first stopper; and a second stopper configured to be spaced apart from the first stopper, and the moving unit includes first moving unit; and a second moving part configured to be spaced apart from the first moving unit, when the first stopper is caught on the first moving unit and the second stopper is caught on the second moving unit, the cover unit covers the discharge hole, and when the body unit is rotated in the direction in which the first stopper pushes the first moving unit, the inner bottle cap is rotated in a direction to close the inlet of the storage container.

* * * * *